US009334166B2

(12) United States Patent
Bowers

(10) Patent No.: US 9,334,166 B2
(45) Date of Patent: May 10, 2016

(54) METHODS AND COMPOSITIONS FOR CHEMICAL DRYING AND PRODUCING STRUVITE

(75) Inventor: Keith E. Bowers, Seattle, WA (US)

(73) Assignee: Multiform Harvest Inc., Seattle, WA (US)

( * ) Notice: Subject to any disclaimer, the term of this patent is extended or adjusted under 35 U.S.C. 154(b) by 427 days.

(21) Appl. No.: 13/983,532

(22) PCT Filed: Feb. 3, 2012

(86) PCT No.: PCT/US2012/023882
§ 371 (c)(1),
(2), (4) Date: Jan. 10, 2014

(87) PCT Pub. No.: WO2012/106680
PCT Pub. Date: Aug. 9, 2012

(65) Prior Publication Data
US 2014/0161704 A1 Jun. 12, 2014

Related U.S. Application Data

(60) Provisional application No. 61/439,214, filed on Feb. 3, 2011.

(51) Int. Cl.
C01B 25/45 (2006.01)
F26B 5/00 (2006.01)
F26B 5/16 (2006.01)
B01J 20/04 (2006.01)
C05B 7/00 (2006.01)
C05D 1/00 (2006.01)

(52) U.S. Cl.
CPC ............ C01B 25/451 (2013.01); B01J 20/048 (2013.01); C01B 25/45 (2013.01); C05B 7/00 (2013.01); C05D 1/00 (2013.01); F26B 5/00 (2013.01); F26B 5/16 (2013.01); F26B 2200/18 (2013.01)

(58) Field of Classification Search
CPC ...... B01J 20/048; C01B 25/45; C01B 25/451; C05B 7/00; C05D 1/00; F26B 5/00; F26B 5/16; F26B 2200/18; C02F 1/26; C02F 1/586; C02F 11/14; C02F 2103/002; C02F 2103/005; C02F 2103/20
See application file for complete search history.

(56) References Cited

U.S. PATENT DOCUMENTS

| 3,348,910 | A | * | 10/1967 | Goodenough | ........ C01B 25/451 423/306 |
| 3,585,020 | A | * | 6/1971 | Legal et al. | ............... C05B 7/00 71/29 |
| 4,402,986 | A | | 9/1983 | Sinkoff | |
| 5,126,049 | A | | 6/1992 | Hallberg | |
| 7,604,740 | B2 | | 10/2009 | Baur | |
| 2003/0217968 | A1 | | 11/2003 | Goel | |
| 2005/0016919 | A1 | | 1/2005 | Hagino | |
| 2005/0051495 | A1 | | 3/2005 | Bowers | |
| 2005/0279475 | A1 | * | 12/2005 | Fournier | .................. A24D 1/02 162/181.1 |
| 2007/0000836 | A1 | | 1/2007 | Elefritz, Jr. | |
| 2007/0044526 | A1 | | 3/2007 | Cabello-Fuentes | |
| 2007/0180877 | A1 | * | 8/2007 | Anderson | ................. C05B 7/00 71/31 |
| 2008/0308505 | A1 | | 12/2008 | Jansen | |
| 2009/0013742 | A1 | | 1/2009 | Zhang | |
| 2009/0078646 | A1 | | 3/2009 | Curtis | |
| 2009/0194476 | A1 | | 8/2009 | Baur | |
| 2010/0170845 | A1 | | 7/2010 | Baur | |
| 2012/0031849 | A1 | | 2/2012 | Britton | |
| 2012/0261334 | A1 | | 10/2012 | Baur | |
| 2012/0261338 | A1 | | 10/2012 | Kuzma | |
| 2013/0062289 | A1 | | 3/2013 | Cote | |

FOREIGN PATENT DOCUMENTS

| EP | 1 698 595 A1 | 9/2006 |
| JP | 11-010194 A | 1/1999 |
| KR | 10-0837698 B1 | 6/2008 |
| WO | 2005/049511 A1 | 6/2005 |
| WO | 2005/077834 A1 | 8/2005 |
| WO | 2008/108599 A1 | 9/2008 |
| WO | 2009/031796 A2 | 3/2009 |
| WO | 2011/143610 A2 | 11/2011 |
| WO | 2012/030847 A2 | 3/2012 |
| WO | 2012/030857 A2 | 3/2012 |

OTHER PUBLICATIONS

International Search Report and Written Opinion mailed Feb. 9, 2012, issued in related International Application No. PCT/US2011/036514, filed May 13, 2011, 11 pages.
International Search Report and Written Opinion mailed May 1, 2012, issued in related International Application No. PCT/US2011/049769, filed Aug. 30, 2011, 9 pages.
International Preliminary Report on Patentability mailed Jan. 11, 2013, issued in related International Application No. PCT/US2011/049769, filed Aug. 30, 2011, 4 pages.
International Search Report and Written Opinion mailed Apr. 20, 2012, issued in related International Application No. PCT/US2011/049784, filed Aug. 30, 2011, 9 pages.
International Preliminary Report on Patentability mailed Mar. 14, 2013, issued in related International Application No. PCT/US2011/049784, filed Aug. 30, 2011, 8 pages.
International Search Report and Written Opinion mailed Oct. 4, 2012, issued in corresponding International Application No. PCT/US2012/023882, filed Feb. 3, 2012, 7 pages.

* cited by examiner

Primary Examiner — Lucas Stelling
(74) Attorney, Agent, or Firm — Christensen O'Connor Johnson Kindness PLLC

(57) ABSTRACT

Methods and compositions for chemical drying and for producing struvite.

20 Claims, No Drawings

METHODS AND COMPOSITIONS FOR CHEMICAL DRYING AND PRODUCING STRUVITE

CROSS-REFERENCE TO RELATED APPLICATION

This application claims the benefit of U.S. Patent Application No. 61/439,214, filed Feb. 3, 2011, which is expressly incorporated herein by reference in its entirety.

BACKGROUND OF THE INVENTION

Magnesium ammonium phosphate is a known, naturally occurring mineral that exists in various forms, including the hexahydrate form ($MgNH_4PO_4 \cdot 6H_2O$), known as struvite. Struvite is crystalline and can be formed from effluent streams in processes that remove phosphorus from wastewater. Because of its phosphorus content, struvite is useful as a fertilizer.

Struvite produced from wastewater treatment is granular in form and can include associated free water. In general, the smaller the size of the struvite granules, the greater the amount of associated free water. Associated free water imparts weight to the granular struvite, which is disadvantageous with regard to struvite handling, packaging, and transport, and in any event must be removed in order to deliver a dry product to users of struvite. In practice, associated free water can be removed from wet struvite by conventional drying, which normally requires heat treatment. However, drying by heat treatment is energy consumptive and costly.

A need exists for a method for producing dry struvite that does not include heating wet struvite. The present invention seeks to fulfill this need and provides further related advantages.

SUMMARY OF THE INVENTION

The present invention provides methods and compositions for chemical drying and producing struvite.

In one aspect of the invention, a method for removing water from a material having associated free water is provided.

In one embodiment, the method includes combining a material having associated free water with a magnesium source and a phosphate source in quantities sufficient to consume the associated free water to produce struvite and a substantially dry material. In one embodiment, the magnesium source is a source of ammonium and/or potassium ions. In another embodiment, the phosphate source is a source of ammonium and/or potassium ions. In one embodiment, the method includes further combining a source of ammonium ions. In another embodiment, the method includes further combining a source of potassium ions.

In another embodiment, the method includes combining a material having associated free water with (a) a magnesium source, (b) a phosphate source, and (c) a source of potassium and/or ammonium ions in quantities sufficient to consume the associated free water to produce struvite and a substantially dry material.

In embodiments of the above methods, the material having associated free water includes from about 10 to about 90 percent by weight associated free water. In other embodiments, the material having associated free water includes from about 30 to about 60 percent by weight associated free water.

In certain embodiments, the material having associated free water is a biosolid.

In other embodiments, the material having associated free water is wet struvite (i.e., struvite having associated free water).

In embodiments of the above methods, the substantially dry material includes from about 0 to about 5 percent by weight associated free water. In other embodiments, the substantially dry material includes from about 0 to about 2 percent by weight associated free water. In other embodiments, the substantially dry material includes less than about 1 percent by weight associated free water.

In the methods, the struvite is the ammonium form, the potassium form, or a mixture of the ammonium and potassium forms.

In another aspect, the invention provides a method for producing substantially dry struvite. In one embodiment, the method includes combining struvite having associated free water with a magnesium source and a phosphate source in quantities sufficient to consume the associated free water to produce substantially dry struvite.

In certain embodiments, the struvite having associated free water is formed from a wastewater treatment process that removes phosphorus from the wastewater.

In one embodiment, the magnesium source is a source of ammonium and/or potassium ions. In another embodiment, the phosphate source is a source of ammonium and/or potassium ions. In one embodiment, the method includes further combining a source of ammonium ions. In another embodiment, the method includes further combining a source of potassium ions.

In certain embodiments, the struvite having associated free water includes from about 10 to about 90 percent by weight associated free water. In other embodiments, the struvite having associated free water includes from about 30 to about 60 percent by weight associated free water.

In certain embodiments, the substantially dry struvite includes from about 0 to about 5 percent by weight associated free water. In other embodiments, the substantially dry struvite includes from about 0 to about 2 percent by weight associated free water. In other embodiments, the substantially dry material includes less than about 1 percent by weight associated free water.

In the methods, the struvite is the ammonium form, the potassium form, or a mixture of the ammonium and potassium forms.

In other aspects, the invention provides products made by the methods of the invention. In certain embodiments, the substantially struvite-containing products made by the methods of the invention are useful as fertilizers.

In a further aspect of the invention, compositions for chemical drying are provided. In one embodiment, the composition includes a phosphate source and a magnesium source, wherein the phosphate source and the magnesium source are present in the composition such that the ratio of phosphate ions delivered by the phosphate source and magnesium ions delivered by the magnesium source is about 1:1.

In one embodiment, the magnesium source is a source of ammonium and/or potassium ions. In another embodiment, the phosphate source is a source of ammonium and/or potassium ions. In one embodiment, the composition further includes a source of ammonium ions. In another embodiment, the composition further includes a source of potassium ions.

In embodiments of the above methods and compositions, the magnesium source is selected from the group consisting of magnesium oxide, magnesium hydroxide, magnesium carbonate, magnesium sulfate, magnesium phosphates, and mixtures thereof; the phosphate source is selected from the group consisting of phosphate, hydrogen phosphate, and dihydrogen phosphate salts of ammonium and metals, and mixtures thereof; the source of ammonium ions is selected from the group consisting of ammonium phosphates, ammonium sulfates, ammonium carbonates, ammonium hydroxide, and ammonium chloride; and the source of potassium ions is selected from the group consisting of potassium phosphates, potassium sulfates, potassium carbonates, potassium hydroxide, potassium chloride, and potassium oxide.

In certain embodiments of the methods and compositions, the phosphate source is ammonium dihydrogen phosphate and the magnesium source is magnesium oxide.

In other embodiments of the methods and compositions, the phosphate source is potassium dihydrogen phosphate and the magnesium source is magnesium oxide.

DETAILED DESCRIPTION OF THE INVENTION

The present invention provides methods and compositions for chemical drying and producing struvite. In accordance with one aspect of the invention, a material that includes associated free water is treated with a phosphate source, a magnesium source, and a source of ammonium and/or potassium ions, to provide struvite and a substantially dry material. In accordance with one aspect of the method of the invention, free water associated with the material reacts with the phosphate source, magnesium source, and source of ammonium and/or potassium ions, to produce struvite. In accordance with another aspect of the invention, a composition is provided that includes a phosphate source, a magnesium source, and a source of ammonium and/or potassium ions, suitable for reaction with a material's associated free water to produce struvite.

In one aspect, the present invention provides a chemical drying of a material that includes associated free water (i.e., material to be dried). As used herein, the term "chemical drying" refers to a method in which free water is effectively removed from a material having associated free water by chemical reaction (i.e., not physical removal of water by, for example, evaporation by heating or sublimation by freeze drying). In the method of the invention, a phosphate source and a magnesium source are combined with a material having associated free water. The associated free water of the material reacts with phosphate source and the magnesium source to produce struvite thereby chemically drying the material. The product of the chemical drying method of the invention is a combination of a substantially dry material and struvite.

As used herein, the term "struvite" refers to ammonium forms, potassium forms, and forms that include ammonium and potassium. The ammonium form of struvite is magnesium ammonium phosphate hexahydrate ($MgNH_4PO_4 \cdot 6H_2O$) and the potassium form is magnesium potassium phosphate hexahydrate ($MgKPO_4 \cdot 6H_2O$). The hydrate component of the struvite formed in accordance with the chemical drying method of the invention is derived from the associated water of the material.

The methods and compositions of the invention are effective to chemically dry a material that includes associated free water. As used herein, the termed "associated free water" refers to water associated with the material that can be removed from the material by the chemical drying method of the invention. Associated free water exists on the surface of particles or granules that make up the material, for example, on the exterior surface of the particles or granules and on surfaces of the internal particle or granule pores. Associated free water is not the crystalline water of the struvite hexahydrate.

Materials having associated free water suitable for chemical drying by the method of the invention include materials that include from about 10 to about 90 percent by weight water, more typically from about 30 to about 60 percent by weight water. Representative materials having associated free water suitable for the method of the invention include biosolids such as wastewater plant biosolids (often called "municipal sludge"), food processing wastes, solids separated from the effluent from digesters of food or other wastes, and agricultural residues such as livestock and crop wastes. In one embodiment, the material having associated free water is wet struvite.

The term "substantially dry material" refers to a material that includes less than about 5 percent by weight associated free water based on the total weight of the dry material (e.g., from about 0 to about 5 percent by weight associated free water). In one embodiment, substantially dry material includes less than about 2 percent by weight associated free water based on the total weight of the dry material (e.g., from about 0 to about 2 percent by weight associated free water). In one embodiment, substantially dry material includes less than about 1 percent by weight associated free water based on the total weight of the dry material (e.g., from about 0 to about 1 percent by weight associated free water).

The amount of water in the material having associated free water and in substantially dry material can be measured by weighing a representative sample of the material before and after drying by heating to constant weight at a temperature between 100° to 150° F., which is sufficient to drive off free associated water, but insufficient to drive off struvite's crystalline water or ammonia.

In one aspect of the method of the invention, a phosphate source, a magnesium source, and a source of ammonium and/or potassium ions, are combined with the material to be dried in quantities sufficient to consume associated free water from the material to provide substantially dry material. It will be appreciated that in embodiments of the method of the invention, the phosphate, magnesium, ammonium, and potassium sources can be combined with the material to be dried in any combination or combined with the material to be dried in any sequence.

Suitable phosphate and magnesium sources useful in the methods and compositions of the invention include phosphate and magnesium sources that provide phosphate ions and magnesium ions, respectively, and that can be combined with the associated free water of the material to be dried to produce struvite.

In certain embodiments, the phosphate source further includes ammonium and/or potassium ions (e.g., ammonium and/or potassium salts of phosphate, hydrogen phosphate, or dihydrogen phosphate).

In certain embodiments, the magnesium source further includes ammonium and/or potassium ions (e.g., double salts of magnesium and ammonium, double salts of magnesium and potassium).

In other embodiments in which neither the phosphate source nor magnesium source includes ammonium and/or potassium ions, the methods and compositions further include a source of ammonium and/or potassium ions.

In certain embodiments, the phosphate source and magnesium source are the same source (e.g., magnesium salts of phosphate or hydrogen phosphate).

Useful phosphate sources include phosphate salts. Suitable phosphate salts include phosphate, hydrogen phosphate and dihydrogen phosphate salts of ammonium and metals (e.g., Group I and II metals such as sodium, potassium, magnesium, calcium). Phosphoric acid is also a suitable phosphate source.

Representative phosphate sources include mono-ammonium phosphate (MAP) ($NH_4H_2PO_4$) (also known as ammonium dihydrogen phosphate), potassium dihydrogen phosphate ($KH_2PO_4$), and the combination of potassium oxide ($K_2O$) with phosphoric acid ($H_3PO_4$).

Useful magnesium sources include magnesium compounds. Representative magnesium compounds include magnesium oxide (MgO), magnesium hydroxide (Mg(OH)$_2$), magnesium carbonate, magnesium sulfate, and magnesium phosphates (e.g., magnesium hydrogen phosphate, magnesium dihydrogen phosphate).

Useful ammonium ion sources include ammonium compounds. Representative ammonium compounds include ammonium phosphates (e.g., ammonium phosphate, ammonium hydrogen phosphate, ammonium dihydrogen phosphate), ammonium sulfates, ammonium carbonates, ammonium hydroxide, and ammonium chloride. Ammonia can also be used to form useful ammonium ion sources.

Useful potassium sources include potassium compounds. Representative potassium compounds include potassium phosphates (e.g., potassium phosphate, potassium hydrogen phosphate, potassium dihydrogen phosphate), potassium sulfates, potassium carbonates, potassium hydroxide, potassium chloride, and potassium oxide.

Struvite formation requires reaction between three soluble ions in aqueous solution, $Mg^{2+}$, $NH_4^+$ or $K^+$, and $PO_4^{3-}$, to form precipitates with low solubility (struvite has a $pK_{sp}$ of 12.6). In general, struvite formation is controlled by pH, supersaturation, and presence of impurities, such as calcium. High pH (e.g., pH 8.5) and supersaturation of the three ions are favorable to struvite formation.

In one embodiment of the method of the invention, the amount of water present in material to be dried (e.g., wet struvite) is determined. Once the amount of water is determined, the magnesium source (e.g., magnesium oxide) and the phosphate source (e.g., mono-ammonium phosphate) are added to the material to be dried in quantities sufficient to consume at least a portion of the associated free water of the material to be dried. As used herein, the term "quantities sufficient" refers to the amounts of the phosphate and magnesium sources necessary to react with and substantially consume the associated free water of the material to be dried. The quantities sufficient are determined based on the stoichiometry of the appropriate chemical equation. The quantities sufficient for a representative system (MgO and MAP) are determined based on the stoichiometry of the chemical equation:

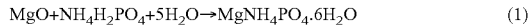

$$MgO + NH_4H_2PO_4 + 5H_2O \rightarrow MgNH_4PO_4 \cdot 6H_2O \quad (1)$$

In the above equation, the reactant $H_2O$ is the associated free water of the material to be dried (e.g., wet struvite). In the above reaction, one mole of magnesium oxide (MgO), one mole of mono-ammonium phosphate ($NH_4H_2PO_4$), and five moles of water ($H_2O$) combine to produce one mole of struvite ($MgNH_4PO_4 \cdot 6H_2O$). Struvite is a hexahydrate. With reference to the above chemical equation, the sixth mole of water of the hexahydrate is formed from the combination of the oxygen (O) of magnesium oxide and the two protons ($H_2$) of $NH_4H_2PO_4$.

As noted above, in one embodiment, the present invention provides a method for producing substantially dry struvite from wet struvite. Wet struvite includes associated free water. Associated free water exists on the surface of struvite granules, for example, on the exterior surface of the granules and on surfaces of the internal granule pores. Associated free water is not the crystalline water of the hexahydrate.

Wet struvite is commonly formed from wastewater treatment processes that remove phosphorus from the wastewater. Wet struvite typically includes from about 10 to about 90 percent by weight water, more typically from about 30 to about 60 percent by weight water.

Wet struvite typically includes struvite granules having a diameter from about 1 µm to about 10,000 µm, more typically from about 10 µm to about 3000 µm.

The struvite forming reaction is an exothermic reaction and as such is effective in pathogen reduction, which may be useful or required for wet struvite formed from wastewater.

In another aspect, the invention provides a composition useful for chemical drying of a material having associated free water. The composition includes combination of a phosphate source as described above and a magnesium source as described above. In one embodiment, the ratio of the phosphate and magnesium sources present in the composition is pre-determined based on the stoichiometry of the appropriate chemical equation, which depends on the nature of the phosphate and magnesium sources (e.g., see Equation 1, for MAP as phosphate source and MgO as magnesium source, the pre-determined molar ratio is 1:1). The amount of the composition used in a chemical drying method, such as the method of the invention, will depend on the amount of material to be dried and the amount of associated free water of the material. In certain embodiments, the phosphate source further includes ammonium and/or potassium ions. In certain embodiments, the magnesium source further includes ammonium and/or potassium ions. In certain embodiments in which neither the phosphate source nor magnesium source include ammonium and/or potassium ions, the compositions further include a source of ammonium and/or potassium ions. In certain embodiments, the phosphate source and the magnesium source are the same (e.g., magnesium hydrogen phosphate, magnesium dihydrogen phosphate).

The phosphate source, magnesium sources, ammonium sources, and potassium sources for the compositions of the invention are the same as those described above in regard to the methods of the invention.

It will be appreciated that in certain embodiments, the compositions of the invention "comprise" the recited components and may include other components not recited. In other embodiments, the compositions of the invention "consist essentially of" the recited components and may include other components not recited that do not materially alter the nature of the compositions (e.g., additional fillers, diluents, or excipients). In other embodiments, the compositions of the invention "consist of" the recited components and do not include any other components.

The following is a description of representative methods of the invention that produce substantially dry struvite from wet struvite. In the Examples 2-4, the wet struvite was struvite crystallized and harvested from Multiform Harvest, Inc.'s pilot plant at the municipal wastewater treatment plant in Corvallis, Oreg. The magnesium oxide in Examples 1, 2, and 3 was calcined magnesium oxide from Premier Chemicals and in Example 4 the magnesium oxide was crude magnesium MgO from Inland Chemicals. The mono-ammonium phosphate in all examples was reagent grade from Fisher Scientific. In all examples, the mixture was stirred and mixing was carried out with a glass rod. In Examples 1 and 4, the vessel was a circular metal foil tray, and in Examples 2 and 3, the vessel was a rectangular metal tray.

Example 1

A sample of wet struvite from a wastewater treatment facility in Monroe, Wash., was determined to include 37.5 percent by weight free associated water. For each gram of free associated water in the sample was added 0.45 g magnesium oxide (MgO) and 1.3 g mono-ammonium phosphate (MAP). The mixture was stirred for about one minute during which time the reaction mixture warmed indicating that the struvite forming reaction was occurring. The reaction mixture was allowed to cool for about 5 minutes and the resulting product (substantially dry struvite) was warm and dry to the touch.

Example 2

A sample of 30.66 grams of wet struvite containing 35% free associated water and 65% struvite (19.93 grams struvite and 10.73 grams free water) was combined with 14.17 grams mono-ammonium phosphate and 5.37 grams magnesium oxide in a vessel. The mixture became warm within 6 minutes, then hot and began to harden at 9 minutes. By 20 minutes, the material had hardened into a smooth, hard, and strong solid that took the shape of the vessel.

Example 3

A sample of 16.51 grams of wet struvite containing 65% free associated water and 35% struvite (5.78 grams struvite and 10.73 grams free water) was combined with 14.17 grams mono-ammonium phosphate and 5.37 grams magnesium oxide in a small vessel. The mixture warmed and began hardening within 11 minutes. By 21 minutes, the mixture had set into a hard solid that took the shape of the vessel.

Example 4

A sample of 21.46 grams of wet struvite containing 50% free associated water was combined with 14.17 grams mono-ammonium phosphate and 6.47 grams of magnesium oxide solid (MgO assay of 83%) and stirred occasionally as it hardened. After 2 hours, the material had become a granular solid material.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for removing water from a material having associated free water, comprising combining a material having associated free water with a magnesium source and a phosphate source in quantities sufficient to consume the associated free water to produce struvite and a substantially dry material.

2. The method of claim 1, wherein the magnesium source is a source of ammonium and/or potassium ions.

3. The method of claim 1, wherein the phosphate source is a source of ammonium and/or potassium ions.

4. The method of claim 1 further comprising adding a source of ammonium ions to the material having associated free water.

5. The method of claim 4, wherein the source of ammonium ions is selected from the group consisting of ammonium phosphates, ammonium sulfates, ammonium carbonates, ammonium hydroxide, and ammonium chloride.

6. The method of claim 1 further comprising adding a source of potassium ions to the material having associated free water.

7. The method of claim 6, wherein the source of potassium ions is selected from the group consisting of potassium phosphates, potassium sulfates, potassium carbonates, potassium hydroxide, potassium chloride, and potassium oxide.

8. The method of claim 1, wherein the magnesium source is selected from the group consisting of magnesium oxide, magnesium hydroxide, magnesium carbonate, magnesium sulfate, magnesium phosphates, and mixtures thereof.

9. The method of claim 1, wherein the phosphate source is selected from the group consisting of phosphate, hydrogen phosphate, and dihydrogen phosphate salts of ammonium and metals, and mixtures thereof.

10. The method of claim 1, wherein the phosphate source is ammonium dihydrogen phosphate and the magnesium source is magnesium oxide.

11. The method of claim 1, wherein the phosphate source is potassium dihydrogen phosphate and the magnesium source is magnesium oxide.

12. The method of claim 1, wherein the material having associated free water includes from about 10 to about 90 percent by weight associated free water.

13. The method of claim 1, wherein the material having associated free water is a biosolid.

14. The method of claim 1, wherein the material having associated free water is wet struvite.

15. The method of claim 1, wherein the struvite is the ammonium form, the potassium form, or a mixture of the ammonium and potassium forms.

16. A method for producing substantially dry struvite, comprising combining struvite having associated free water with a magnesium source and a phosphate source in quantities sufficient to consume the associated free water to produce substantially dry struvite.

17. The method of claim 16, wherein the struvite having associated free water is formed from a wastewater treatment process that removes phosphorus from the wastewater.

18. The method of claim 16, wherein the substantially dry struvite includes from about 0 to about 2 percent by weight associated free water.

19. The method of claim 16, wherein the substantially dry struvite includes less than about 1 percent by weight associated free water.

20. The method of claim 16, wherein the substantially dry struvite is the ammonium form, the potassium form, or a mixture of the ammonium and potassium forms.

* * * * *